(12) United States Patent
Nishide et al.

(10) Patent No.: US 10,495,139 B2
(45) Date of Patent: Dec. 3, 2019

(54) BALL JOINT AND METHOD FOR MANUFACTURING BALL JOINT

(71) Applicant: THK CO., LTD., Tokyo (JP)

(72) Inventors: Tetsuhiro Nishide, Tokyo (JP); Takuya Horie, Tokyo (JP); Satoshi Kashiwagura, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/571,916

(22) PCT Filed: Mar. 1, 2016

(86) PCT No.: PCT/JP2016/001101
§ 371 (c)(1),
(2) Date: Nov. 6, 2017

(87) PCT Pub. No.: WO2016/181590
PCT Pub. Date: Nov. 17, 2016

(65) Prior Publication Data
US 2018/0087564 A1 Mar. 29, 2018

(30) Foreign Application Priority Data

May 11, 2015 (JP) ................................. 2015-096541

(51) Int. Cl.
*F16C 11/06* (2006.01)
*B23K 31/02* (2006.01)

(52) U.S. Cl.
CPC .......... *F16C 11/0609* (2013.01); *B23K 31/02* (2013.01); *F16C 11/0633* (2013.01);
(Continued)

(58) Field of Classification Search
CPC ..... B23K 31/02; B23P 2700/11; B60G 7/005; F16C 11/06; F16C 11/0604;
(Continued)

(56) References Cited

U.S. PATENT DOCUMENTS 3,831,245 A     8/1974   Amos
3,965,554 A *   6/1976   Amos ................. F16C 11/0609
                                                                29/898.053
(Continued)

FOREIGN PATENT DOCUMENTS

DE            4032541 A1 *   4/1992   .......... F16C 11/0638
DE     102007011360 A1 *   9/2008   ............. B60G 7/005
(Continued)

OTHER PUBLICATIONS

"Making steels stronger." Capudean, Bob. Original Date: Sep. 10, 2003. Captured Date: Sep. 14, 2013. [retrieved on Sep. 27, 2018]. Retrieved from the Internet <URL: https://web.archive.org/web/20130914030006/http://www.thefabricator.com:80/article/metalsmaterials/making-steels-stronger>. (Year: 2013).*
(Continued)

*Primary Examiner* — Josh Skroupa
(74) *Attorney, Agent, or Firm* — Westerman, Hattori, Daniels & Adrian, LLP (57) ABSTRACT

This ball join includes a ball stud with a spherical ball section and a shaft-shaped shaft section and a holder that rotatably bolds the ball section, and has a machining surface subjected to cutting in a welded portion obtained by welding the ball section and the shaft section, and the machining surface has a curve-shaped first corner section. In addition, a method for manufacturing this ball joint includes a welding step of welding the ball section and the shaft section and a cutting step of forming the machining surface by subjecting the welded portion obtained by welding the ball section and the shaft section to cutting, and the cutting step executes processing including forming the curve-shaped first corner section on the machining surface. Consequently, a ball joint with a large oscillation angle can be obtained.

5 Claims, 10 Drawing Sheets (52) U.S. Cl.
CPC ....... *F16C 11/0685* (2013.01); *F16C 11/0614* (2013.01); *F16C 11/0671* (2013.01); *F16C 2226/36* (2013.01); *Y10T 29/49666* (2015.01); *Y10T 403/32729* (2015.01)

(58) Field of Classification Search
CPC .............. F16C 11/0609; F16C 11/0614; F16C 11/0633; F16C 11/0671; F16C 11/0685; F16C 2220/60; F16C 2220/66; F16C 2220/70; F16C 2226/36; Y10T 29/49666; Y10T 403/32631; Y10T 403/32729
USPC ............................. 403/122, 134; 29/898.053
See application file for complete search history.

(56) References Cited

U.S. PATENT DOCUMENTS

| | | | | |
|---|---|---|---|---|
| 4,979,844 | A * | 12/1990 | Teramachi | F16C 11/0604 403/122 |
| 5,876,149 | A * | 3/1999 | Dorr | F16C 11/0671 403/122 |
| 5,951,195 | A | 9/1999 | Ruholl | |
| 6,098,287 | A * | 8/2000 | Takahashi | F16C 11/0685 29/898.053 |
| 6,615,900 | B2 | 9/2003 | Takahashi | F16C 11/0604 164/108 |
| 6,652,179 | B2 * | 11/2003 | De Freitas | F16C 11/0671 403/134 |
| 7,585,572 | B2 * | 9/2009 | Hattori | F16C 11/0604 403/165 |
| 8,864,155 | B2 * | 10/2014 | Kuroda | F16C 11/0685 403/122 |
| 8,870,201 | B2 * | 10/2014 | Kuroda | F16C 11/0685 403/133 |
| 8,905,417 | B2 * | 12/2014 | Kuroda | F16C 11/0685 403/122 |
| 9,056,538 | B2 * | 6/2015 | Kuroda | F16C 11/0685 |
| 9,133,931 | B2 * | 9/2015 | Kuroda | F16C 11/0671 |
| 9,278,602 | B2 * | 3/2016 | Kuroda | F16C 11/0671 |
| 9,289,863 | B2 * | 3/2016 | Bongartz | F16C 11/0609 |
| 9,393,850 | B2 * | 7/2016 | Kuroda | F16C 11/0671 |
| 9,470,259 | B2 * | 10/2016 | Nordloh | F16C 11/0685 |
| 9,476,447 | B2 * | 10/2016 | Schmidt | B60G 7/005 |
| 9,546,679 | B2 * | 1/2017 | Sato | F16C 11/06 |
| 9,719,554 | B2 * | 8/2017 | Nishide | F16C 11/0609 |
| 9,863,463 | B2 * | 1/2018 | Mizutani | F16C 11/0685 |
| 2013/0121754 | A1 * | 5/2013 | Kuroda | F16C 11/0685 403/122 |

FOREIGN PATENT DOCUMENTS

| | | |
|---|---|---|
| JP | 54-27658 A | 3/1979 |
| JP | 61-168322 U | 10/1986 |
| JP | 2000-81025 A | 3/2000 |
| JP | 2004-278666 A | 10/2004 |

OTHER PUBLICATIONS

International Search Report dated May 31, 2016, issued in counterpart application No. PCT/JP2016/001101. (2 pages).
Notification of Reasons for Refusal dated Aug. 9, 2016, issued in counterpart Japanese Patent Application No. 2015-096541, w/English translation (8 pages).
Notice of Allowance dated Sep. 20, 2016, issued in counterpart Japanese Patent Application No. 2015-096541, w/English translation (7 pages).

* cited by examiner

BALL JOINT AND METHOD FOR MANUFACTURING BALL JOINT

TECHNICAL FIELD

The present invention relates to a ball joint and a method for manufacturing a ball joint.

BACKGROUND ART

Known in the related art is a ball joint that includes a ball stud with a spherical ball section and a shaft-shaped shaft section and a holder that rotatably holds the ball section. For example, Patent Literature 1 described below discloses a ball joint, of which a ball head portion is formed by inserting a male screw section, a screw shaft-shaped member, into a mold for molding a ball head corresponding to a shape of a spherical ball head portion to inject dissolved resin and connected to the screw shaft-shaped member, and a method for manufacturing the ball joint.

CITATION LIST

Patent Literature

Patent Literature 1: JP 2000-81025 A

DISCLOSURE OF THE INVENTION

Problems to be Solved by the Invention

However, with the ball joint described in Patent Literature 1 described above, a shaft diameter of a connected part between the ball head portion and the screw shaft-shaped member is larger than a shaft diameter of the screw shaft-shaped member, which makes it difficult to widen an oscillation angle of the ball joint. Therefore, it is desirable to realize a ball joint, of which a shaft diameter of a shaft section of a ball stud is made smaller to widen an oscillation angle.

Thus, the present invention has been made in view of the above problems, and an object thereof is to provide a ball joint with a large oscillation angle and a method for manufacturing the ball joint.

Means for Solving the Problems

A ball joint in accordance with an embodiment of the present invention includes a ball stud with a spherical ball section and a shaft-shaped shaft section and a holder that rotatably holds the ball section, wherein a welded portion obtained by welding the ball section and the shaft section has a machining surface subjected to cutting, and the machining surface has a curve-shaped first corner section.

A method for manufacturing a ball joint in accordance with an embodiment of the present invention includes a ball stud with a spherical ball section and a shaft-shaped shaft section and a holder that rotatably holds the ball section, and includes a welding step of welding the ball section and the shaft section and a cutting step of forming a machining surface by subjecting a welded portion obtained by welding the ball section and the shaft section to cutting, wherein the cutting step subjects the machining surface to processing including a step of forming a curve-shaped first corner section.

Effects of the Invention

In accordance with an embodiment of the present invention, it is possible to provide a ball joint with a large oscillation angle and a method for manufacturing the ball joint.

BRIEF DESCRIPTION OF THE DRAWINGS

FIGS. 3A and 3B are partially enlarged views of a ball joint in accordance with the present embodiment.

FIGS. 6A to 6C are schematic views for illustrating a method for manufacturing a ball stud in accordance with the present embodiment.

FIG. 9 illustrates specific configuration examples of possible external appearance shapes of a ball joint in accordance with the present embodiment and a modification. FIG. 9(*a*) is a back view. FIG. 9(*b*) is a plan view. FIG. 9(*c*) is a front side perspective view. FIG. 9(*d*) is a left side view. FIG. 9(*e*) is a front view. FIG. 9(*f*) is a right side view. FIG. 9(*g*) is a back side perspective view. FIG. 9(*h*) is a bottom view.

FIG. 10 illustrates specific configuration examples of possible external appearance shapes of a ball joint in accordance with the present embodiment and a modification. FIG. 10(*a*) is a back view. FIG. 10(*b*) is a plan view. FIG. 10(*c*) is a front side perspective view. FIG. 10(*d*) is a left side view. FIG. 10(*e*) is a front view. FIG. 10(*f*) is a right side view. FIG. 10(*g*) is a back side perspective view. FIG. 10(*h*) is a bottom view.

MODE FOR CARRYING OUT THE INVENTION

Preferred embodiments for carrying out the present invention will be described below using the drawings. Embodiments below do not limit the invention claimed in each claim, and all combinations of features described in the embodiments are not necessarily essential to means for solving the problems of the invention.

Figure 1:
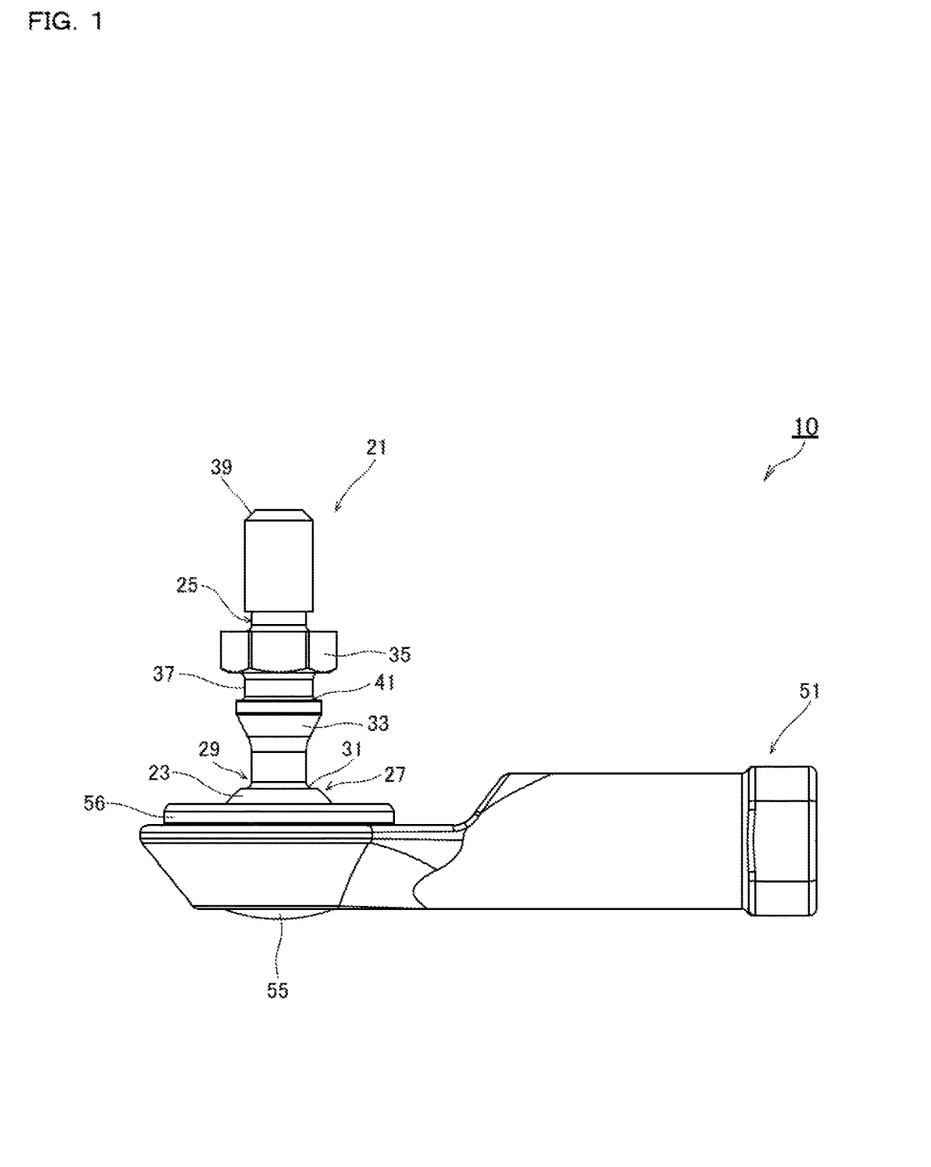
FIG. 1 is a side view exemplifying an external appearance of a ball joint in accordance with the present embodiment.
Figure 2:
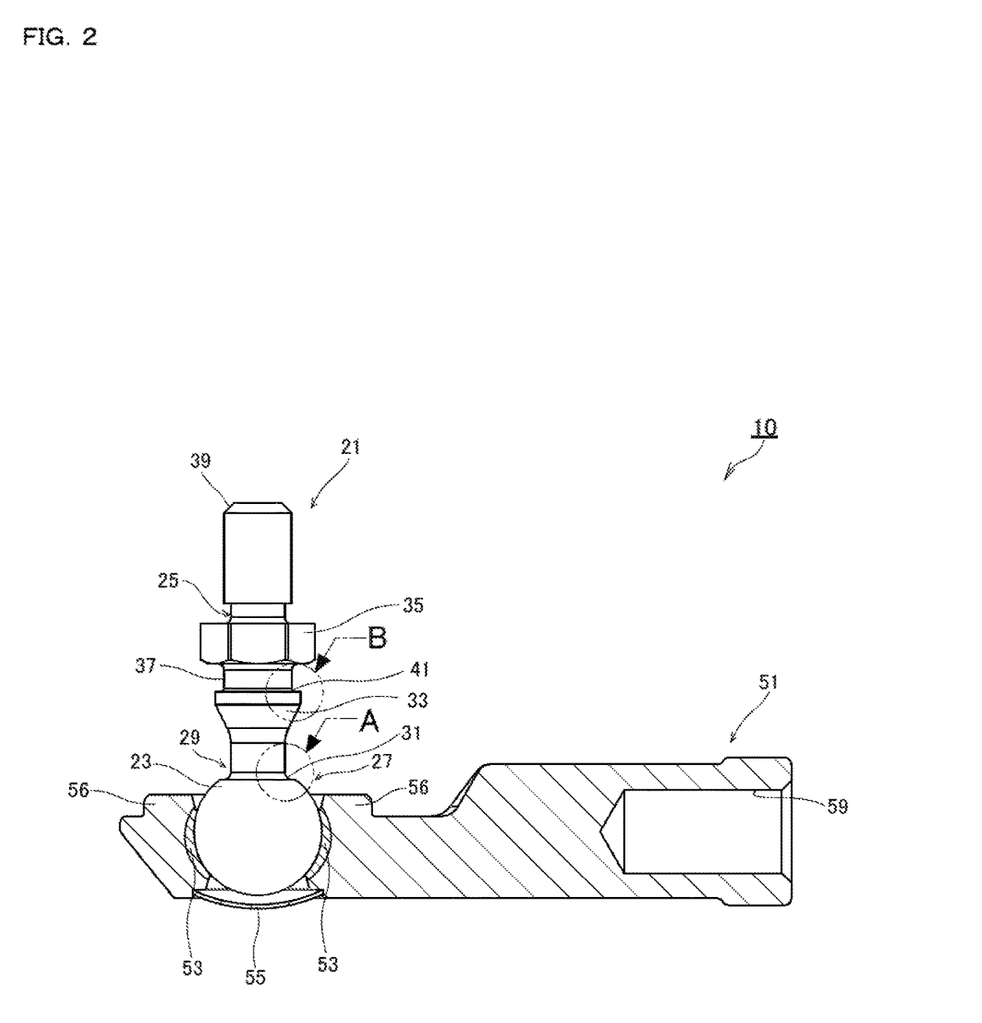
FIG. 2 is a longitudinal sectional side view illustrating a configuration example of a ball joint in accordance with the present embodiment.
Figure 3A:
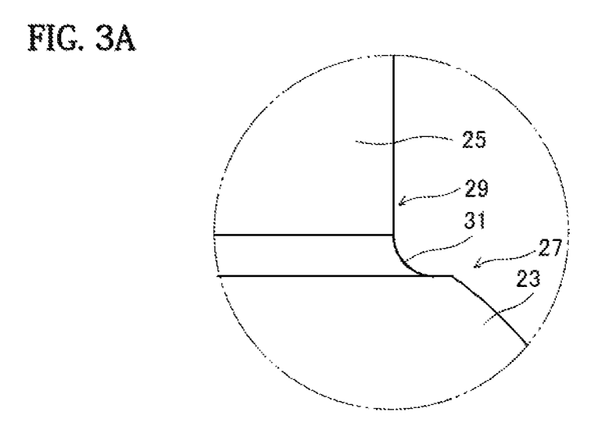
FIG. 3A is an enlarged view of part A in FIG. 2
Figure 3B:
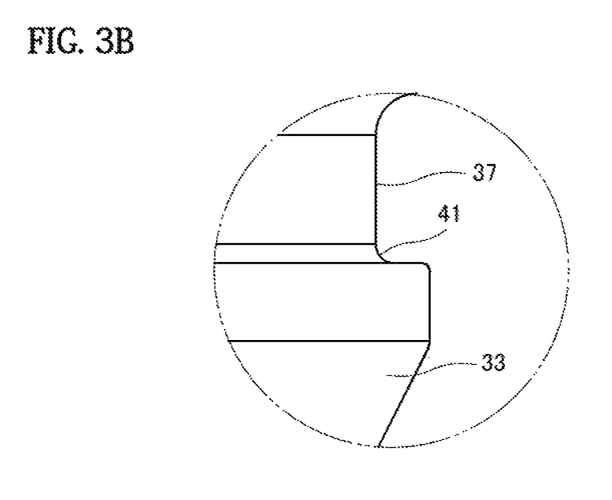
FIG. 3B is an enlarged view of part B in FIG. 2.
Figure 4:
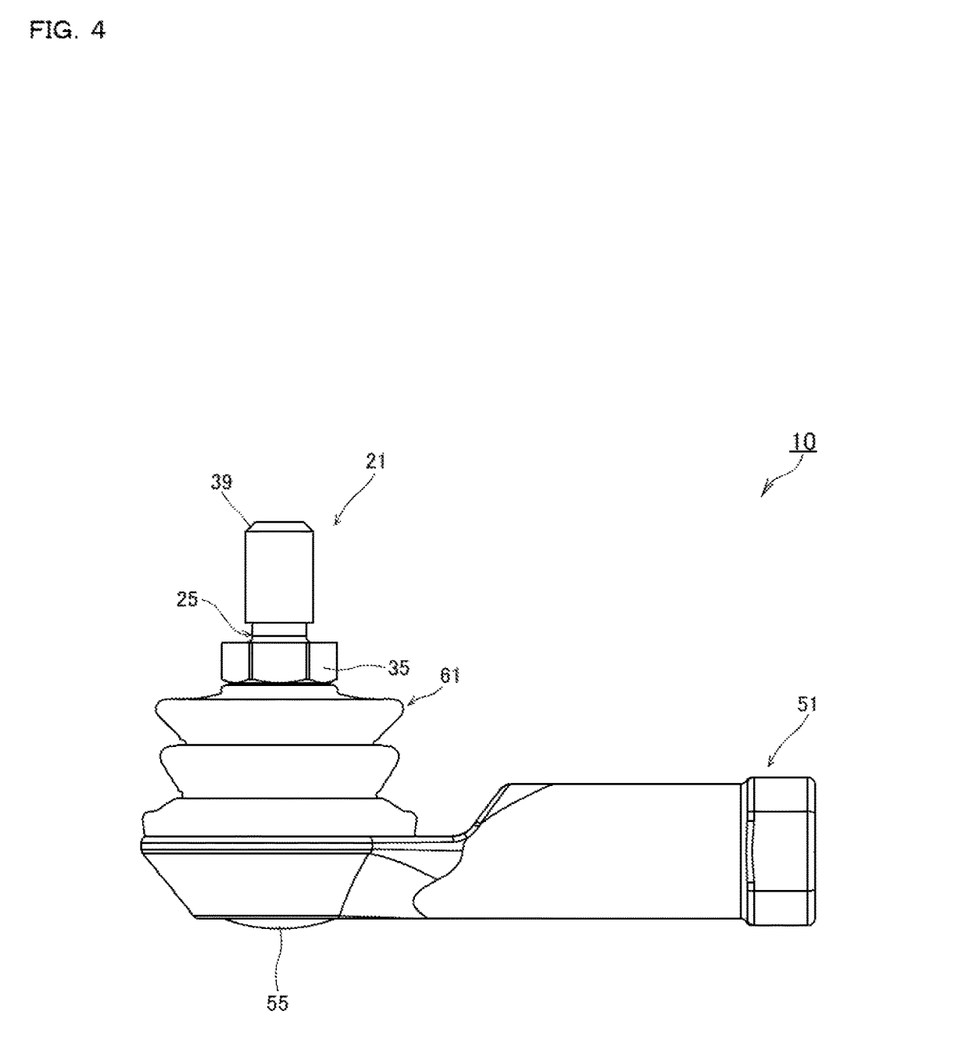
FIG. 4 is an external appearance side view exemplifying a ball joint in accordance with the present embodiment with a dust cover mounted.
Figure 5:
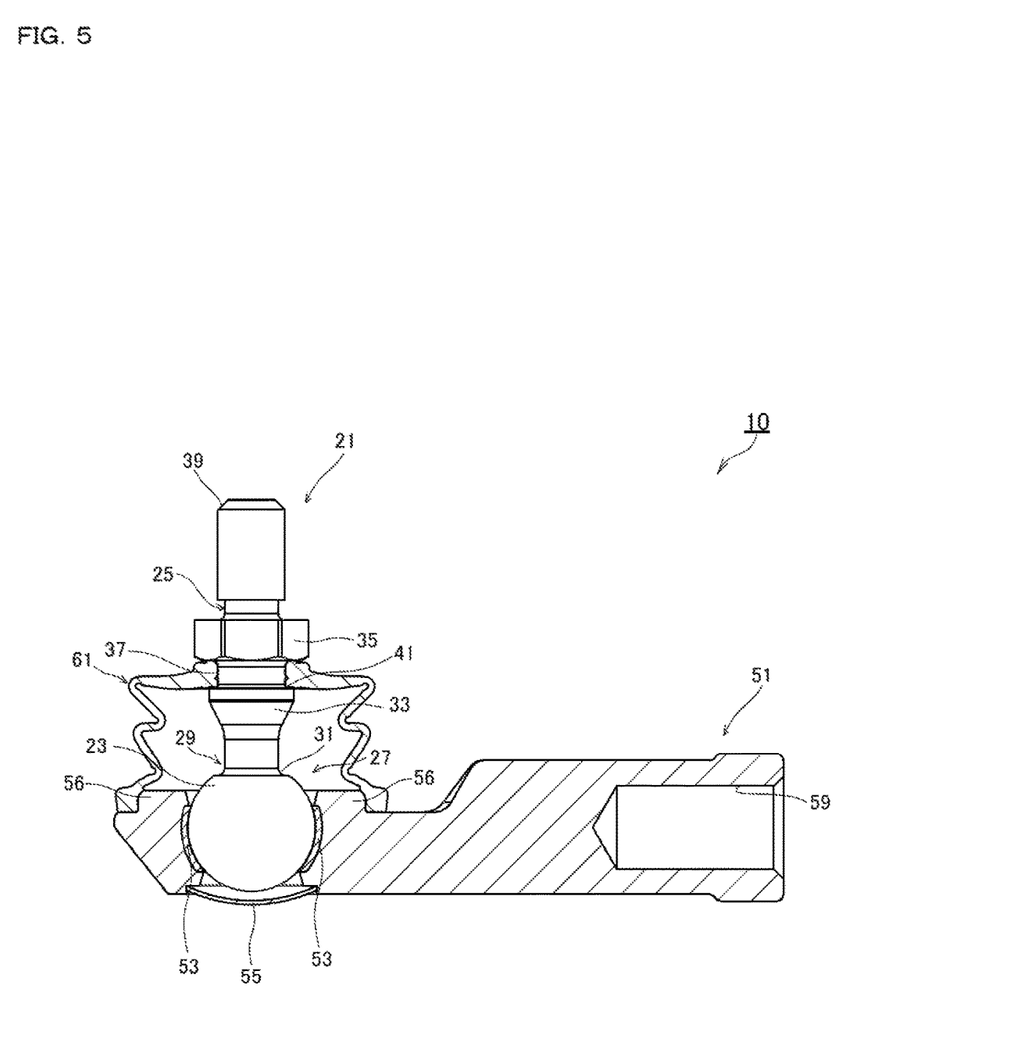
FIG. 5 is a longitudinal sectional side view exemplifying a ball joint in accordance with the present embodiment with a dust cover mounted.

Firstly, a configuration example of a ball joint in accordance with the present embodiment will be described using FIGS. 1 to 5. Here, FIG. 1 is a side view exemplifying an external appearance of a ball joint in accordance with the present embodiment. FIG. 2 is a longitudinal sectional side view illustrating a configuration example of a ball joint in accordance with the present embodiment. In addition, FIGS. 3A and 3B are partially enlarged views of a ball joint in accordance with the present embodiment. FIG. 3A is an enlarged view of part A in FIG. 2, and FIG. 3B is an enlarged view of part B in FIG. 2. Furthermore, FIG. 4 is an external appearance side view exemplifying a ball joint in accordance with the present embodiment with a dust cover mounted. FIG. 5 is a longitudinal sectional side view exemplifying a ball joint in accordance with the present embodiment with a dust cover mounted.

As illustrated in FIG. 1, a ball joint 10 in accordance with the present embodiment includes a ball stud 21 with a spherical ball section 23 and a shaft-shaped shaft section 25 and a holder 51 that rotatably holds the ball section 23.

The ball stud 21 is formed by welding the spherical ball section 23 and the shaft-shaped shaft section 25. As illustrated in FIGS. 2 and 3A, the ball stud 21 has a welded portion 27 obtained by welding the ball section 23 and the shaft section 25. In other words, the welded portion 27 includes a part of the ball section 23 and a part of the shaft section 25.

As illustrated in FIGS. 1, 2, and 3A, a machining surface 29 subjected to cutting is formed in the welded portion 27, and the machining surface 29 has a curve-shaped first corner section 31. Mounting of the first corner section 31 on the machining surface 29 formed in the welded portion 27 improves strength compared with a case where the ball section 23 and the shaft section 25 are welded to form a machining surface in a linear shape. In addition, as illustrated in FIGS. 1, 2, and 3A, the first corner section 31 is arranged on the ball section 23. By arrangement of the first corner section 31 on the ball section 23, positions of forming the first corner section 31 and the welded portion 27 are provided shifting from each other without superposition. Therefore, it is possible to prevent stress concentration on the welded portion 27 and separation of welding between the ball section 23 and the shaft section 25. Furthermore, the first corner section 31 is formed larger in curvature radius than a second corner section 41 described later. This is because it is possible to reduce effects of stress on the first corner section 31 formed near the welded portion 27 by concentrating stress on the second corner section 41 formed smaller in curvature radius rather than on the first corner section 31 formed larger in curvature radius. With this type of configuration, the ball joint 10 in accordance with the present embodiment can prevent stress concentration on the welded portion 27 when the ball joint 10 oscillates, and suitably prevent the separation of the welding between the ball section 23 and the shaft section 25.

For the ball section 23, a steel ball for bearing with high sphericity is used. The use of a steel ball for bearing with high sphericity as the ball section 23 can reduce a gap between the ball section 23 and a resin sliding contact member 53 described later, and smooth oscillation of the ball joint 10 is realized.

Additionally, as illustrated in FIGS. 1 and 2, the shaft section 25 includes a truncated-cone-shaped section 33 in a truncated cone shape, a collar-shaped flange section 35, a recess 37 formed between the truncated-cone-shaped section 33 and the flange section 35, and a male screw section 39 with a male screw formed on a side of the shaft section 25, opposite to a welding side of the ball section 23.

As illustrated in FIG. 3B, the truncated-cone-shaped section 33 and the recess 37 are connected to each other with the curve-shaped second corner section 41. As described above, the second corner section 41 is formed smaller in curvature than the first corner section 31. Therefore, when seen as a whole, the ball stud 21 is configured to have stress concentrate on the second corner section 41. With this type of configuration, the ball joint 10 in accordance with the present embodiment can prevent stress concentration on the welded portion 27 when the ball joint 10 oscillates and the separation of the welding between the ball section 23 and the shaft section 25.

A dust cover 61 described later can be attached to the recess 37 formed between the truncated-cone-shaped section 33 and the flange section 35.

An external component (not illustrated) where a female screw fit into a male screw of the male screw section 39 is formed is connected to the male screw section 39.

The holder 51 includes the resin sliding contact member 53 made of resin, a cap section 55 that seals a lubricant, a stepped section 56 for attaching the dust cover 61 described later, and a female screw section 59 where a female screw is formed. A lubricant is sealed in the cap section 55 and the dust cover 61 described later.

The resin sliding contact member 53 is to prevent friction of the ball section 23 and can rotate the ball section 23 via a lubricant.

An external component (not illustrated) such as a rod where a male screw fit into a female screw of the female screw section 59 is formed is connected to the female screw section 59. Thus, the ball joint 10 in accordance with the present embodiment fulfills a function of linking the external component (not illustrated) where the female screw fit into the male screw of the male screw section 39 is formed with the external component (not illustrated) such as a rod where the male screw fit into the female screw of the female screw section 59 is formed.

As illustrated in FIGS. 4 and 5, it is possible to attach to the ball joint 10 in accordance with the present embodiment the dust cover 61 for preventing intrusion of, for example, dust and refuse between the ball section 23 and the holder 51 using the recess 37 of the shaft section 25 of the ball stud 21 and the stepped section 56 formed on the holder 51.

The dust cover 61 in accordance with the present embodiment has a bellows shape, and can cover the ball section 23 and a part of the holder 51 even when the ball joint 10 with a large oscillation angle is oscillated by expansion and contraction of pleats included in the bellows shape and prevent intrusion of, for example, dust and refuse between the ball section 23 and the holder 51. Then, as described above, a lubricant is sealed in the cap section 55 and the dust cover 61.

Figure 6A:
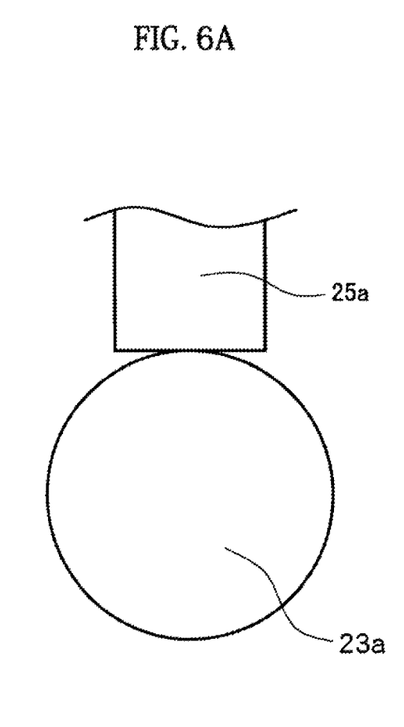
FIG. 6A is a schematic view of a ball stud before execution of a welding step.
Figure 6B:
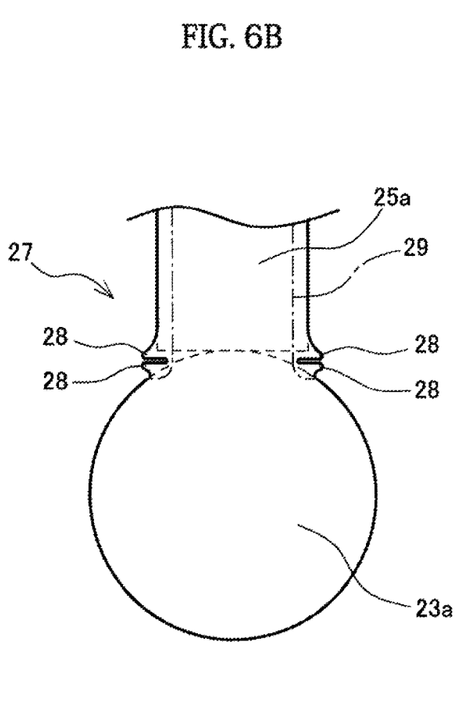
FIG. 6B is a schematic view of a ball stud after welding.
Figure 6C:
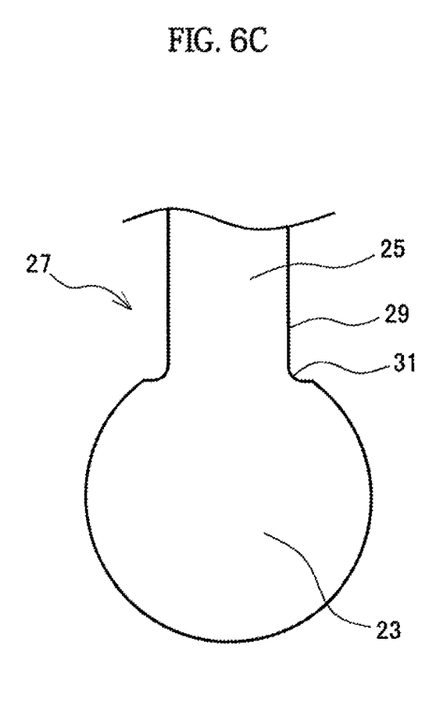
FIG. 6C is a schematic view of a ball stud after execution of a cutting step.

A configuration example of the ball joint 10 in accordance with the present embodiment has been described above. Next, a method for manufacturing the ball joint 10 in accordance with the present embodiment will be described using FIGS. 2 and 6. Here, FIGS. 6A to 6C are schematic views for illustrating a method for manufacturing a ball stud in accordance with the present embodiment. FIG. 6 is a schematic view of a ball stud before execution of a welding step, FIG. 6B is a schematic view of a ball stud after welding, and FIG. 6C is a schematic view of a ball stud after execution of a cutting step.

The method for manufacturing the ball joint 10 in accordance with the present embodiment includes a welding step of welding a spherical ball section 23a and a shaft-shaped shaft section 25a, and a cutting step of forming the machining surface 29 by subjecting the welded portion 27 obtained by welding the ball section 23a and the shaft section 25a to cutting.

Firstly, as illustrated in FIG. 6A, the ball section 23a with high sphericity and the shaft section 25a formed larger in shaft diameter than the shaft section 25 before cutting are welded (welding step). In terms of a means used in the welding step, any type of publicly known welding means can be used.

As a specific example of the welding means used in this welding step, projection welding, for example, can be used. Projection welding is a sort of electric resistance welding and makes it possible to suitably weld the shaft section 25 to the ball section 23a. In other words, describing with reference to FIGS. 2 and 6 simultaneously, a lower end surface of the shaft section 25 is pressure-welded to an upper side of a spherical surface of the ball section 23a exposed from the holder 51 with a predetermined force (see a state in FIG. 6A), while an unillustrated electrode is made abut each of the holder 51 and the shaft section 25 to apply welding current thereto.

The holder 51 is manufactured by casting the ball section 23a and the resin sliding contact member 53 as a core, and a tip concave spherical surface (not illustrated) where the spherical surface of the ball section 23a is transferred is formed at a ball mounting position of the holder 51. The unillustrated tip concave spherical surface is in close contact with the spherical surface of the ball section 23a. Therefore, by making an electrode abut near the ball mounting position of the holder 51, it is possible to apply welding current to the ball section 23a from the ball mounting position and subject the ball section 23a and the shaft section 25a to electric resistance welding.

Then, once electric resistance welding is completed as described above, a tip surface of the shaft section 25a is, as illustrated in FIG. 6B, welded to the ball section 23a, and the ball section 23a is held in a body section of the holder 51 via the resin sliding contact member 53.

In order to subject the ball section 23a and the shaft section 25a to electric resistance welding, it is necessary that current resistance between the ball mounting position of the holder 51 and the ball section 23a is low compared with current resistance between the ball section 23a and the shaft section 25a. This is because heat is generated on a boundary surface between the ball mounting position of the holder 51 and the ball section 23a to fix the ball mounting position of the holder 51 to the ball section 23a, in a case where current resistance therebetween is higher than current resistance between the ball section 23a and the shaft section 25a. Therefore, it is necessary to set a contact area between the ball mounting position of the holder 51 and the ball section 23a larger than an area of a welded portion between the ball section 23a and the shaft section 25a. Here, an area of a welded portion is an area where the tip surface of the shaft section 25a is welded to the ball section 23a, and equivalent to a cross-section area of the shaft section 25a. More precisely, an area of a welded portion is a surface area of the spherical surface of the ball section 23a in a part where the shaft section 25a is welded to the ball section 23a.

At a stage after the holder 51 is cast and before the shaft section 25a is welded to the ball section 23a, the ball mounting position of the holder 51 tightens the ball section 23a from outside of the resin sliding contact member 53 by advanced contraction of the holder 51 after casting. Therefore, without any change, a large resistance is applied to rotation of the ball section 23a against the resin sliding contact member 53. The tip concave spherical surface (not illustrated) formed at the ball mounting position of the holder 51 by casting the holder 51 is in close contact with the ball section 23a. Therefore, free rotation of the ball section 23a is disturbed on this point as well.

However, when the shaft section 25a is subjected to electric resistance welding to the ball section 23a after casting the holder 51, a periphery of a welded part between the ball section 23a and the shaft section 25a serves as a heat generating source to heat the ball section 23a and transfers the heat to the resin sliding contact member 53 tightening the ball section 23a as well. The ball section 23a and the resin sliding contact member 53 have a difference in thermal expansion coefficient and also in contraction rate during cooling. Therefore, the resin sliding contact member 53 once expanded by heating does not completely return to its original shape at a contraction stage during cooling, which makes it possible to loosen tightening of the ball section 23a by the resin sliding contact member 53.

At this time, the ball section 23a itself thermally expands slightly more than at normal temperature to push and expand the resin sliding contact member 53, but a heat generating source is the welded part between the ball section 23a and the shaft section 25a. Therefore, the ball section 23a has an expansion amount larger near an upper part of the ball mounting position of the holder 51 and smaller near a lower part thereof apart from the heat generating source than near the upper part. In other words, an amount of pushing and expanding the resin sliding contact member 53 by the thermal expansion of the ball section 23a is larger near the upper part of the ball mounting position of the holder 51 than near the lower part thereof. As a result, with the welding between the ball section 23a and the shaft section 25a completed and the ball cooled, the ball section 23a is slightly displaced in a direction in which the ball section 23a floats up from the ball mounting position of the holder 51. The ball section 23a is in contact with the tip concave spherical surface (not illustrated) at the ball mounting position of the holder 51, though a contact surface pressure therebetween is reduced.

In other words, with the ball joint 10 in accordance with the present embodiment, once the electric resistance welding between the ball section 23a and the shaft section 25a is completed, a tightening force on the ball section 23a by the resin sliding contact member 53 is reduced, and in addition, the contact surface pressure between the ball section 23a and the tip concave spherical surface (not illustrated) at the ball mounting position of the holder 51 is reduced, which makes it possible to lightly move the ball stud 21 completed through the welding against the holder 51.

In the welding step executed in the present embodiment, a measure for cooling slowly is carried out at a central part of the welding and joining of the ball section 23a and the shaft section 25a. The reason for this will be described in detail when a result of an examination on a metallic structure described later is described.

The method for manufacturing the ball joint 10 in accordance with the present embodiment makes it possible to increase heat generation, improve welding strength of the welded portion 27 obtained by welding the ball section 23 and the shaft section 25, and decrease starting torque that oscillates the ball joint 10 by making the shaft section 25a larger in shaft diameter than a finished product in welding the ball section 23a and the shaft section 25a.

Meanwhile, when the ball section 23a and the shaft section 25a are subjected to the welding step described above, a part of each of the ball section 23a and the shaft section 25a is, as illustrated FIG. 6B, melted to form a bead 28.

Thus next, the machining surface 29 is formed by subjecting the welded portion 27 obtained by welding the ball section 23a and the shaft section 25a to cutting (cutting step). As illustrated in FIG. 6B, a part of the welded ball section 23a and shaft section 25a, that is, the welded portion 27 is subjected to cutting to a part of the machining surface 29 indicated with a one-dot chain line in FIG. 6B to go into a state illustrated in FIG. 6C. With the method for manufacturing the ball joint 10 in accordance with the present embodiment, by subjecting the welded portion 27 to the cutting step, the shaft section 25 with a shaft diameter of the shaft section 25a smaller than during welding is formed, the machining surface 29 is formed, the bead 28 is removed, and furthermore, the first corner section 31 is formed on the ball section 23. In other words, the cutting step includes a step of forming the first corner section 31 on the machining surface 29.

In other words, the method for manufacturing the ball joint 10 in accordance with the present embodiment can quickly decrease the shaft diameter of the shaft section 25a, form the machining surface 29, remove the bead 28, and form the first corner section 31 as a series of processes.

With the method for manufacturing the ball joint 10 in accordance with the present embodiment described above, the shaft diameter of the shaft section 25 of the ball stud 21 can be formed smaller. Therefore, it is possible to provide the ball joint 10 with a large oscillation angle. In addition, the bead 28 may become a starting point of the separation of the welding in the welded portion 27. Thus, with the method for manufacturing the ball joint 10 in accordance with the present embodiment where a step of removing this bead 28 is carried out, it is possible to suitably prevent the separation of the welding in the welded portion 27. Furthermore, with the method for manufacturing the ball joint 10 in accordance with the present embodiment, it is possible to provide the ball joint 10 with improved strength by forming the first corner section 31 on the machining surface 29 formed in the welded portion 27. By formation of the first corner section 31 on the ball section 23, positions of forming the first corner section 31 and the welded portion 27 are separated from each other. Therefore, it is possible to prevent stress concentration on the welded portion 27 and the separation of the welding between the ball section 23 and the shaft section 25.

Here, the first corner section 31 formed on the machining surface 29 is formed larger in curvature radius than the second corner section 41. Thus, with the method for manufacturing the ball joint 10 in accordance with the present embodiment, when the ball joint 10 oscillates and when the ball stud 21 is seen as a whole, larger stress is applied to the second corner section 41 smaller in curvature radius, and thus stress concentration on the first corner section 31 near the welded portion 27 can be prevented. Therefore, with the method for manufacturing the ball joint 10 in accordance with the present embodiment, stress concentration on the welded portion 27 can be suitably prevented and the separation of the welding between the ball section 23 and the shaft section 25 can be prevented.

With the manufacturing method described above, the ball stud 21 with the ball section 23 and the shaft section 25 welded is rotatably arranged on the holder 51 via the resin sliding contact member 53. A method for assembling the ball stud 21 and the holder 51 is as described above, but a method for manufacturing the ball joint in accordance with an embodiment of the present invention is not limited to the above and other conventional, publicly known techniques can be used. In other words, the method for manufacturing the ball joint 10 in accordance with the present embodiment has features in a step of manufacturing the ball stud 21.

The method for manufacturing the ball joint 10 in accordance with the present embodiment has been described above. Next, a result of an examination on a metallic structure of the ball stud manufactured with the method for manufacturing the ball stud in accordance with the present embodiment will be described using FIG. 7. Here, FIG. 7 is a view for illustrating the result of the examination on the metallic structure of the ball stud manufactured with the method for manufacturing the ball stud in accordance with the present embodiment.

Various types of knowledge have been obtained from the examination on a metallic structure of the ball stud 21 manufactured with the manufacturing method described above by inventors. This examination has been carried out by selecting each part of the ball stud 21 to cut out and embed into resin, subjecting an observed surface to mirror finish to corrode with a chemical, and observing microscopically.

Figure 7:
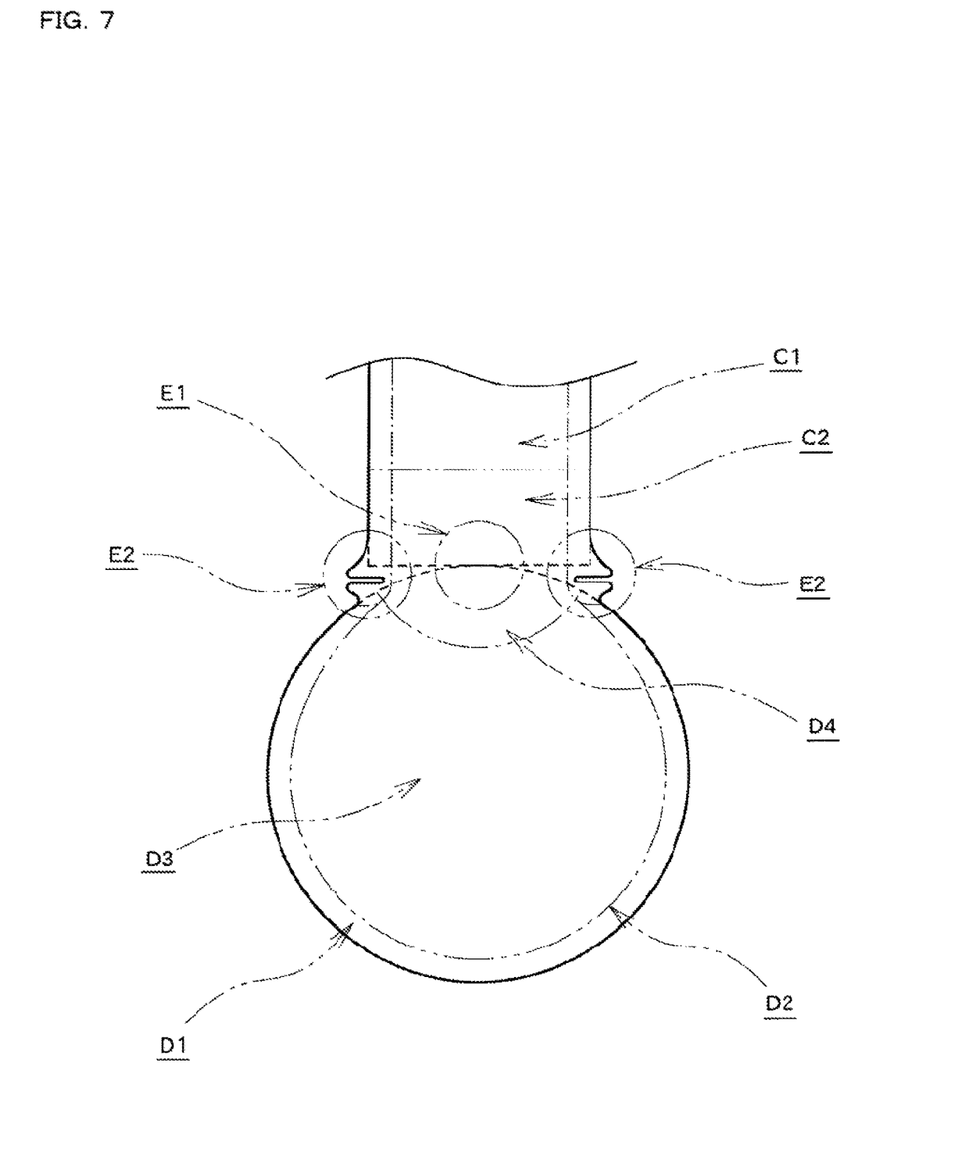
FIG. 7 is a view for illustrating a result of an examination on a metallic structure of a ball stud manufactured with a method for manufacturing a ball stud in accordance with the present embodiment.

Firstly, a zone indicated with sign C1 in FIG. 7 is a zone in the shaft section 25a thermally unaffected by welding, and a metallic structure of the zone indicates a medium-carbon martensite structure. A zone indicated with sign C2 in FIG. 7 is a zone in the shaft section 25a thermally affected by welding, and a metallic structure of the zone indicates a bainite structure.

On the other hand, zones indicated with signs D1 to D4 in FIG. 7 are zones where an examination on the ball section 23a has been carried out. The zone indicated with sign D1 in FIG. 7 is an area of a carburized, quenched layer originally included in the ball section 23a, and a metallic structure of the zone indicates a high-carbon martensite structure. The zone indicated with sign D2 in FIG. 7 is a boundary area between the carburized, quenched layer, a surface layer originally included in the ball section 23a, and inside thereof, and a metallic structure of the zone indicates a mixed structure of martensite and troostite. The zone indicated with sign D3 in FIG. 7 is an inside area unaffected by carburizing and quenching which the ball section 23a is originally subjected to, and a metallic structure of the zone indicates a mixed structure of low-carbon martensite and ferrite/pearlite. The zone indicated with sign D4 in FIG. 7 is a welded area between the ball section 23a and the shaft section 25a and an area where the ball section 23a is most affected by heat by the welding step described above, and a metallic structure of the zone indicates a mixed structure of high-carbon martensite and bainite.

Furthermore, the inventors have examined metallic structures of areas indicated with signs E1 and E2 in FIG. 7 in order to make a more detailed examination of the welded area between the ball section 23a and the shaft section 25a. In other words, the area indicated with sign E1 in FIG. 7 is the central part of the welding and joining of the ball section 23a and the shaft section 25a. The area indicated with sign E2 in FIG. 7 is a forming part of the bead 28 formed by a part of each of the ball section 23a and the shaft section 25a melted in the welding step. In addition, in the area indicated with sign E1 in FIG. 7, it is confirmed that fine pearlite is precipitated in a crystal grain boundary of the metallic structure on a side of the shaft section 25a. On the other hand, in the area indicated with sign E2 in FIG. 7, a martensite structure is observed on a side of the ball section 23a and a bainite structure is observed on the side of the shaft section 25a.

Based on the observation of the metallic structure described above, it is firstly found that a metallic structure of the ball stud 21 obtained by executing the manufacturing method in accordance with the present embodiment is very advantageous in executing the welding step where the metallic structure is thermally affected. In other words, at the forming part of the bead 28 indicated with sign E2 in FIG. 7, the structure changes rapidly and a part in a cut-out shape called the bead 28 is formed. Therefore, when stress concentrates on the part, fracture may be caused. However, with the manufacturing method in accordance with the present embodiment, at the central part of the welding and joining of the ball section 23a and the shaft section 25a, indicated with sign E1 in FIG. 7, fine pearlite is precipitated in the crystal grain boundary of the metallic structure by cooling slowly, and strength of this part is decreased compared with other parts. In other words, stress is dispersed by decreasing the strength of the central part of the welding and joining indicated with sign E1, and stress concentration on the forming part of the bead 28 indicated with sign E2 can be relieved. As a result, fracture strength of a welded portion on the ball stud 21 increases, and occurrence of abnormalities during welding can be suitably prevented. Such effects contribute to an effective decrease of manufacture failure rate during manufacture of the ball stud 21, and an effect of decreasing manufacturing costs is also exerted.

In addition, the above effects are exerted effectively even after the cutting step is executed to complete the ball stud 21. A sign indicated by the metallic structure inside the welded portion 27 on the ball stud 21 that fine pearlite is precipitated in the crystal grain boundary as indicated with sign E1 in FIG. 7, coupled with an effect obtained from an outer shape of the first corner section 31 described above, contributes to improvement of the fracture strength of the ball stud 21 in accordance with the present embodiment. Thus, with the method for manufacturing the ball joint 10 in accordance with the present embodiment, it is possible to prevent stress concentration on the welded portion 27 by suitable effects in terms of both metallic structure and shape and the separation of the welding between the ball section 23 and the shaft section 25.

Figure 8:
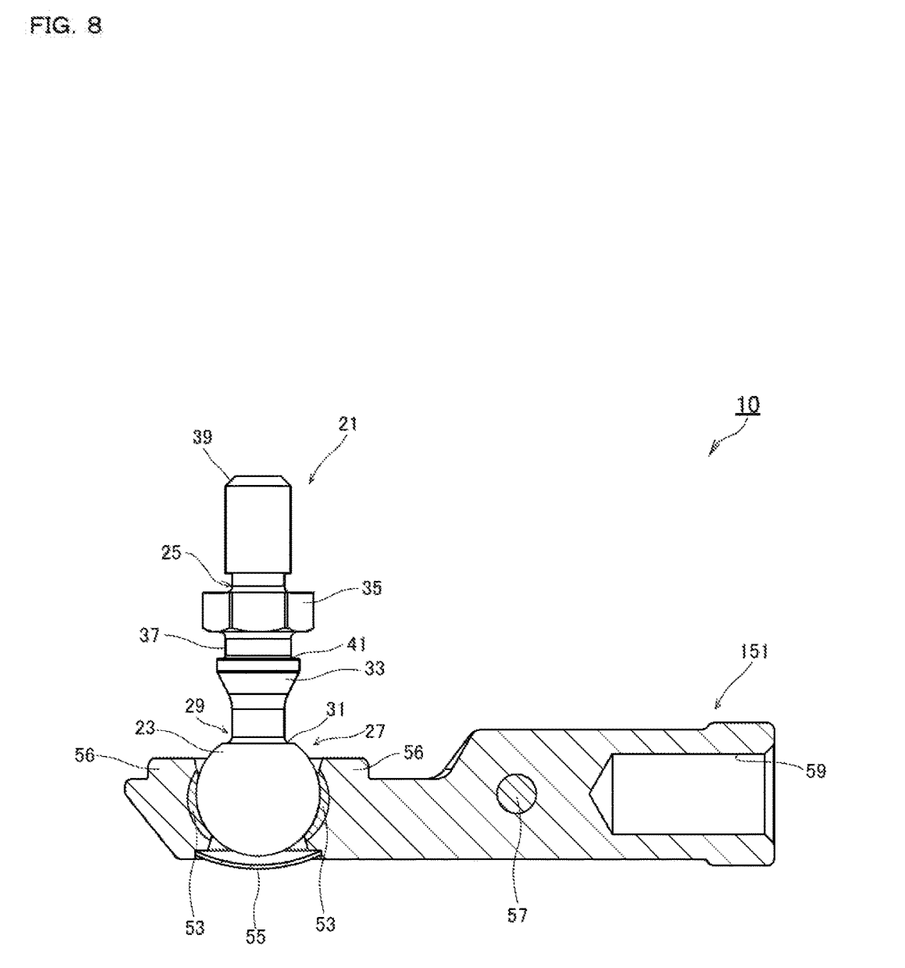
FIG. 8 is a longitudinal sectional side view illustrating a modification of a ball joint in accordance with the present embodiment.

Next, a modification of the ball joint 10 in accordance with the present embodiment will be described using FIG. 8. Here, FIG. 8 is a longitudinal sectional side view illustrating the modification of the ball joint in accordance with the present embodiment. As for configurations identical or similar to the above embodiment, descriptions thereof will be omitted with identical signs.

As illustrated in FIG. 8, a holder 151 in accordance with the modification includes the resin sliding contact member 53 made of resin, the cap section 55 that seals a lubricant, the stepped section 56, a pin 57 outsert molded in the holder 151, and the female screw section 59 where a female screw is formed.

The holder 151 in accordance with the modification has the pin 57 outsert molded, and an external component (not illustrated) such as a rotation bearing can be mounted. Use of this pin 57 expands variations in use range of the ball joint 10 in accordance with the modification.

Figure 9:
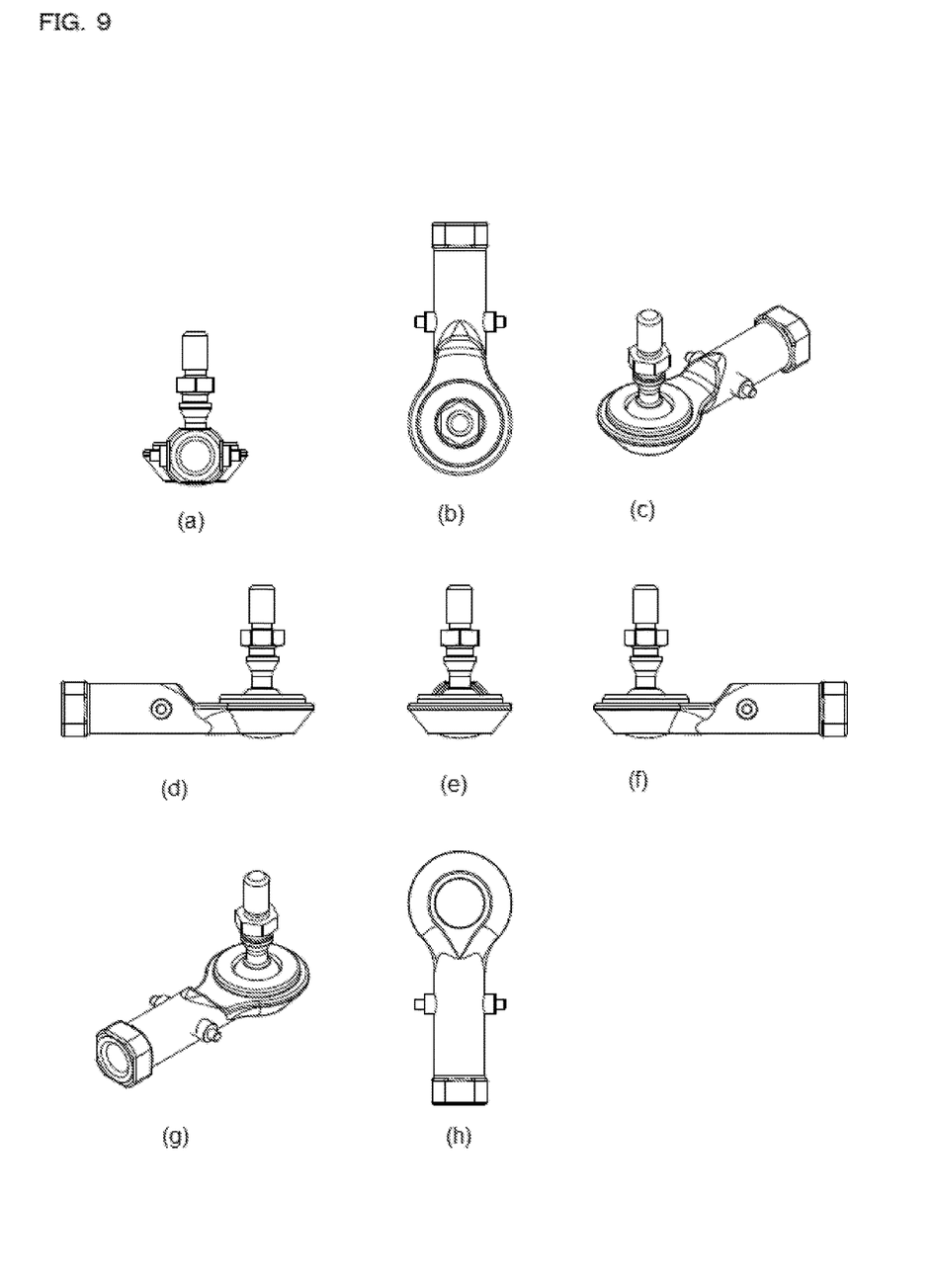
Figure 10:
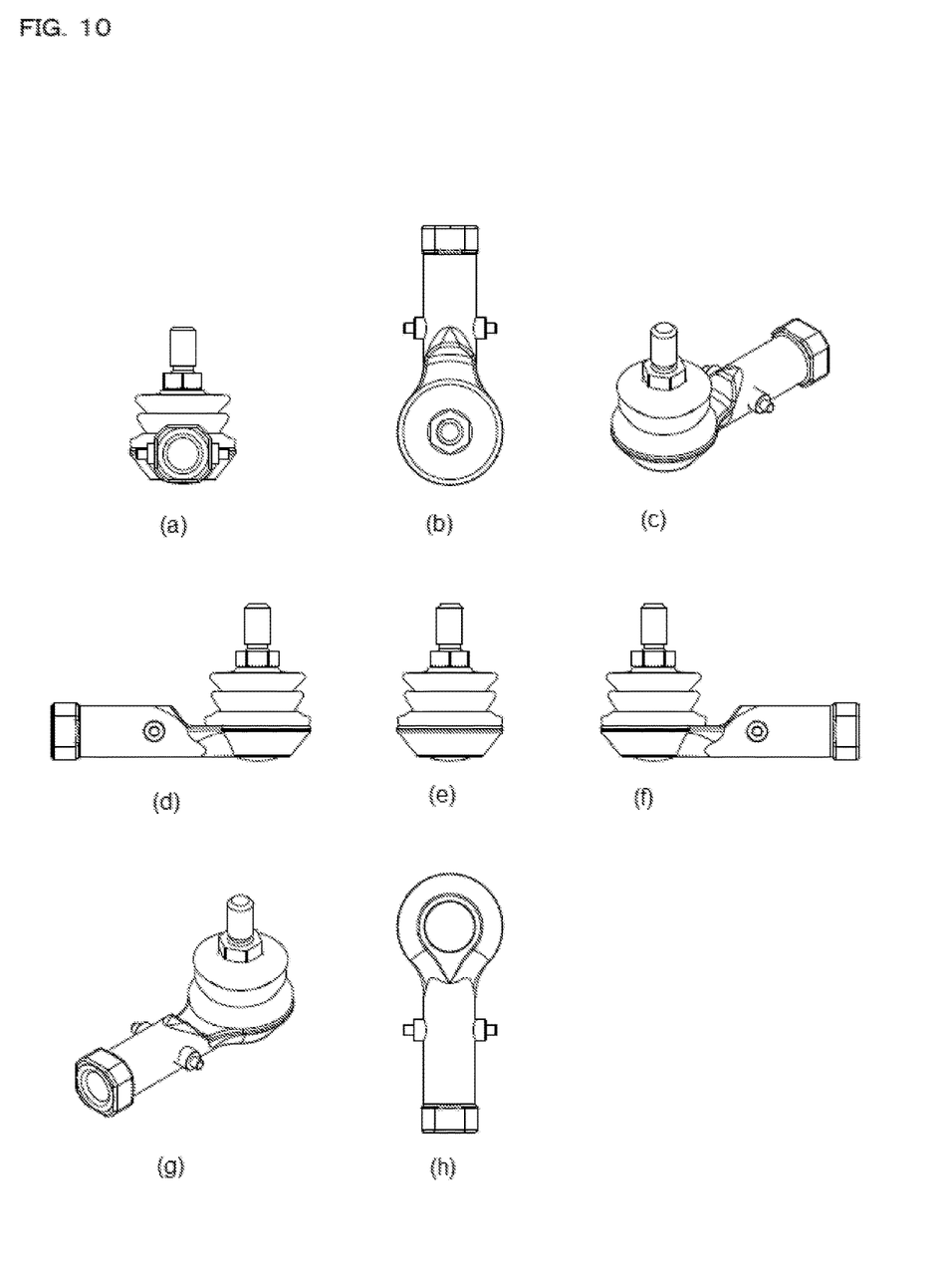

Preferred embodiments of the present invention have been described above. Specific configuration examples of the ball joint 10 in accordance with the present embodiment and the modification described above will be illustrated in FIGS. 9 and 10. Here, FIGS. 9 and 10 are views illustrating specific configuration examples of possible external appearance shapes of the ball joint in accordance with the present embodiment and the modification. FIG. 9 illustrates the ball joint without the dust cover, and FIG. 10 illustrates the ball joint with the dust cover.

Preferred embodiments of the present invention have been described above, but the technical scopes thereof are not limited to the scopes described in the embodiments. Various types of changes or improvements can be made in the above embodiments. It is obvious from descriptions in claims that embodiments with such changes or improvements can also be included in the technical scope of the present invention.

REFERENCE NUMERALS

10: ball joint, 21: ball stud, 23, 23a: ball section, 25, 25a: shaft section, 27: welded portion, 28: bead, 29: machining surface, 31: first corner section, 33: truncated-cone-shaped section, 35: flange section, 37: recess, 39: male screw section, 41: second corner section, 51, 151: holder, 53: resin sliding contact member, 55: cap section, 56: stepped section, 57: pin, 59: female screw section, 61: dust cover

The invention claimed is:
1. A ball joint comprising:
a ball stud with a spherical ball section and a shaft-shaped shaft section;
a holder that rotatably holds the ball section;
a welded portion obtained by welding the ball section and the shaft section; and
a machining surface subjected to cutting formed on the ball stud, the holder, and the welded portion,
wherein the machining surface has a curve-shaped first corner section,
wherein the shaft section of the ball stud comprises: a truncated-cone-shaped section in a truncated cone shape; a collar-shaped flange section; and a recess formed between the truncated-cone-shaped section and the flange section,
the truncated-cone-shaped section and the recess are connected to each other with a curve-shaped second corner section,
the first corner section is formed larger in curvature radius than the second corner section, and
wherein the first corner section is formed axially between and adjacent to the welded portion and the ball stud.
2. The ball joint according to claim 1, wherein at least a part of the first corner section is arranged on the ball section.
3. A ball joint comprising:
a ball stud with a spherical ball section and a shaft-shaped shaft section;
a holder that rotatably holds the ball section;
a welded portion obtained by welding the ball section and the shaft section; and
a machining surface subjected to cutting formed on the ball stud, the holder, and the welded portion,
wherein the machining surface has a curve-shaped first corner section,
wherein a metallic structure at a central part of the welded portion obtained by welding the ball section and the shaft section indicates a sign that fine pearlite is precipitated in a crystal grain boundary, and
wherein the first corner section is formed axially between and adjacent to the welded portion and the ball stud.
4. The ball joint according to claim 3, wherein at least a part of the first corner section is arranged on the ball section.
5. A method for manufacturing a ball joint comprising: a ball stud with a spherical ball section and a shaft-shaped shaft section; and a holder that rotatably holds the ball section, the method including:
a welding step of welding the ball section and the shaft section; and a cutting step of forming a machining surface formed on the ball stud, the holder, and the welded portion by subjecting a welded portion obtained by welding the ball section and the shaft section to cutting, wherein the cutting step subjects the machining surface to processing including a step of forming a curve-shaped first corner section, wherein the welding step executes processing for precipitating fine pearlite in a crystal grain boundary of a metallic structure by cooling after welding at a central part of the welded portion obtained by welding the ball section and the shaft section, and wherein the first corner section is formed axially between and adjacent to the welded portion and the ball stud.

\* \* \* \* \*